(12) United States Patent
Grasegger et al.

(10) Patent No.: US 9,925,721 B2
(45) Date of Patent: Mar. 27, 2018

(54) DEVICE FOR PRODUCING THREE-DIMENSIONAL MODELS

(71) Applicant: Voxeljet AG, Friedberg (DE)

(72) Inventors: Josef Grasegger, Stadtergen (DE); Andreas Dominik Hartmann, Stadtbergen (DE)

(73) Assignee: VOXELJET AG, Friedberg (DE)

( * ) Notice: Subject to any disclaimer, the term of this patent is extended or adjusted under 35 U.S.C. 154(b) by 420 days.

(21) Appl. No.: 14/547,676

(22) Filed: Nov. 19, 2014

(65) Prior Publication Data

US 2016/0114533 A1 Apr. 28, 2016

Related U.S. Application Data

(63) Continuation of application No. 13/576,529, filed as application No. PCT/DE2011/000092 on Feb. 1, 2011, now Pat. No. 8,956,144.

(30) Foreign Application Priority Data

Feb. 4, 2010 (DE) ........................ 10 2010 006 939

(51) Int. Cl.
| | |
|---|---|
| B29C 67/00 | (2017.01) |
| B33Y 30/00 | (2015.01) |
| B29C 64/141 | (2017.01) |
| B29C 64/20 | (2017.01) |
| B33Y 40/00 | (2015.01) |

(Continued)

(52) U.S. Cl.
CPC ........ *B29C 67/0085* (2013.01); *B29C 64/141* (2017.08); *B29C 64/20* (2017.08); *B33Y 30/00* (2014.12); *B29K 2105/251* (2013.01); *B33Y 10/00* (2014.12); *B33Y 40/00* (2014.12)

(58) Field of Classification Search
CPC . B29C 67/0074; B29C 67/0085; B33Y 30/00; B33Y 10/00; B29K 2105/251
See application file for complete search history.

(56) References Cited

U.S. PATENT DOCUMENTS

| | | | |
|---|---|---|---|
| 4,575,330 A | 3/1986 | Hull | |
| 4,665,492 A | 5/1987 | Masters | |

(Continued)

FOREIGN PATENT DOCUMENTS

| | | | |
|---|---|---|---|
| AU | 720255 B2 | 5/2000 | |
| DE | 4102260 A1 | 7/1992 | |

(Continued)

OTHER PUBLICATIONS

US 4,937,420, 06/1990, Deckard (withdrawn)
(Continued)

*Primary Examiner* — Joseph S Del Sole
*Assistant Examiner* — John Robitaille
(74) *Attorney, Agent, or Firm* — The Dobrusin Law Firm, P.C.

(57) ABSTRACT

The present invention relates to a device for manufacture of three-dimensional models by means of a 3D printing process, whereby the build material is deposited on a build platform in layers and the build platform is moveable in the Z-direction and one or several drive units and one or several guide elements is/are provided to move the build platform. In so doing, drive units and guiding elements are arranged in such a way that a movement of the drive units is decoupled from the movement of the guiding elements.

20 Claims, 4 Drawing Sheets

(51) Int. Cl.
  *B33Y 10/00*       (2015.01)
  *B29K 105/00*      (2006.01)

(56) References Cited

U.S. PATENT DOCUMENTS

| | | |
|---|---|---|
| 4,752,352 A | 6/1988 | Feygin |
| 4,863,538 A | 8/1989 | Deckard |
| 4,938,816 A | 7/1990 | Beaman et al. |
| 4,944,817 A | 7/1990 | Bourell et al. |
| 5,017,753 A | 5/1991 | Deckard |
| 5,053,090 A | 10/1991 | Beaman et al. |
| 5,059,266 A | 10/1991 | Yamane et al. |
| 5,076,869 A | 12/1991 | Bourell et al. |
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A | 4/1993 | Sachs et al. |
| 5,216,616 A | 6/1993 | Masters |
| 5,248,456 A | 8/1993 | Evans, Jr. et al. |
| 5,252,264 A | 10/1993 | Forderhase et al. |
| 5,269,982 A | 12/1993 | Brotz |
| 5,284,695 A | 2/1994 | Barlow et al. |
| 5,296,062 A | 3/1994 | Bourell et al. |
| 5,316,580 A | 5/1994 | Deckard |
| 5,340,656 A | 8/1994 | Sachs et al. |
| 5,342,919 A | 8/1994 | Dickens, Jr. et al. |
| 5,352,405 A | 10/1994 | Beaman et al. |
| 5,354,414 A | 10/1994 | Feygin |
| 5,382,308 A | 1/1995 | Bourell et al. |
| 5,387,380 A | 2/1995 | Cima et al. |
| 5,431,967 A | 7/1995 | Manthiram et al. |
| 5,482,659 A | 1/1996 | Sauerhoefer |
| 5,490,962 A | 2/1996 | Cima et al. |
| 5,506,607 A | 4/1996 | Sanders, Jr. et al. |
| 5,555,176 A | 9/1996 | Menhennett et al. |
| 5,573,055 A | 11/1996 | Melling et al. |
| 5,573,721 A | 11/1996 | Gillette |
| 5,582,231 A | 12/1996 | Siak et al. |
| 5,589,222 A | 12/1996 | Thometzek et al. |
| 5,597,589 A | 1/1997 | Deckard |
| 5,616,294 A | 4/1997 | Deckard |
| 5,616,631 A | 4/1997 | Kiuchi et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 6/1997 | Retallick et al. |
| 5,658,412 A | 8/1997 | Retallick et al. |
| 5,665,401 A | 9/1997 | Serbin et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,747,105 A | 5/1998 | Haubert |
| 5,749,041 A | 5/1998 | Lakshminarayan et al. |
| 5,753,274 A | 5/1998 | Wilkening et al. |
| 5,807,437 A | 9/1998 | Sachs et al. |
| 5,837,960 A | 11/1998 | Lewis et al. |
| 5,851,465 A | 12/1998 | Bredt |
| 5,884,688 A | 3/1999 | Hinton et al. |
| 5,902,441 A | 5/1999 | Bredt et al. |
| 5,902,537 A | 5/1999 | Almquist et al. |
| 5,904,889 A | 5/1999 | Serbin et al. |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 5,997,795 A | 12/1999 | Danforth |
| 6,007,318 A | 12/1999 | Russell et al. |
| 6,036,777 A | 3/2000 | Sachs |
| 6,037,389 A | 3/2000 | Archibald et al. |
| 6,042,774 A | 3/2000 | Wilkening et al. |
| 6,048,188 A | 4/2000 | Hull et al. |
| 6,048,954 A | 4/2000 | Barlow et al. |
| 6,116,517 A | 8/2000 | Heinzl et al. |
| 6,133,353 A | 10/2000 | Bui et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,175,422 B1 | 1/2001 | Penn et al. |
| 6,193,922 B1 | 2/2001 | Ederer |
| 6,210,625 B1 | 4/2001 | Matsushita |
| 6,216,508 B1 | 4/2001 | Matsubara et al. |
| 6,217,816 B1 | 4/2001 | Tang |
| 6,259,962 B1 | 7/2001 | Gothait |
| 6,270,335 B2 | 8/2001 | Leyden et al. |
| 6,305,769 B1 | 10/2001 | Thayer et al. |
| 6,318,418 B1 | 11/2001 | Grossmann et al. |
| 6,316,060 B1 | 12/2001 | Elvidge et al. |
| 6,322,728 B1 | 12/2001 | Brodkin et al. |
| 6,335,052 B1 | 1/2002 | Suzuki et al. |
| 6,335,097 B1 | 1/2002 | Otsuka et al. |
| 6,350,495 B1 | 2/2002 | Schriener et al. |
| 6,355,196 B1 | 3/2002 | Kotnis et al. |
| 6,375,874 B1 | 4/2002 | Russell et al. |
| 6,395,811 B1 | 5/2002 | Nguyen et al. |
| 6,401,001 B1 | 6/2002 | Jang et al. |
| 6,403,002 B1 | 6/2002 | Van Der Geest |
| 6,405,095 B1 | 6/2002 | Jang et al. |
| 6,416,850 B1 | 7/2002 | Bredt et al. |
| 6,423,255 B1 | 7/2002 | Hoechsmann et al. |
| 6,436,334 B1 | 8/2002 | Hattori et al. |
| 6,460,979 B1 | 10/2002 | Heinzl et al. |
| 6,467,525 B2 | 10/2002 | Herreid et al. |
| 6,476,122 B1 | 11/2002 | Leyden |
| 6,485,831 B1 | 11/2002 | Fukushima et al. |
| 6,500,378 B1 | 12/2002 | Smith |
| 6,552,130 B1 | 4/2003 | Makino et al. |
| 6,554,600 B1 | 4/2003 | Hofmann et al. |
| 6,596,224 B1 | 7/2003 | Sachs et al. |
| 6,610,429 B2 | 8/2003 | Bredt et al. |
| 6,616,030 B2 | 9/2003 | Miller |
| 6,658,314 B1 | 12/2003 | Gothait |
| 6,672,343 B1 | 1/2004 | Perret et al. |
| 6,713,125 B1 | 3/2004 | Sherwood et al. |
| 6,722,872 B1 | 4/2004 | Swanson |
| 6,733,528 B2 | 5/2004 | Abe et al. |
| 6,742,456 B1 | 6/2004 | Kasperchik et al. |
| 6,764,636 B1 | 7/2004 | Allanic et al. |
| 6,827,988 B2 | 12/2004 | Krause et al. |
| 6,830,643 B1 | 12/2004 | Hayes |
| 6,838,035 B1 | 1/2005 | Ederer et al. |
| 6,855,205 B2 | 2/2005 | McQuate et al. |
| 6,896,839 B2 | 5/2005 | Kubo et al. |
| 6,972,115 B1 | 12/2005 | Ballard |
| 6,989,115 B2 | 1/2006 | Russell et al. |
| 7,004,222 B2 | 2/2006 | Ederer et al. |
| 7,037,382 B2 | 5/2006 | Davidson et al. |
| 7,048,530 B2 | 5/2006 | Gaillard et al. |
| 7,049,363 B2 | 5/2006 | Shen |
| 7,087,109 B2 | 8/2006 | Bredt et al. |
| 7,120,512 B2 | 10/2006 | Kramer et al. |
| 7,137,431 B2 | 11/2006 | Ederer et al. |
| 7,153,463 B2 | 12/2006 | Leuterer et al. |
| 7,204,684 B2 | 4/2007 | Ederer et al. |
| 7,220,380 B2 | 5/2007 | Farr et al. |
| 7,291,002 B2 | 11/2007 | Corp |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,381,360 B2 | 6/2008 | Oriakhi et al. |
| 7,387,359 B2 | 6/2008 | Hernandez et al. |
| 7,402,330 B2 | 7/2008 | Pfeiffer et al. |
| 7,431,987 B2 | 10/2008 | Pfeiffer et al. |
| 7,435,072 B2 | 10/2008 | Collins et al. |

(56) References Cited

U.S. PATENT DOCUMENTS

| | | |
|---|---|---|
| 7,435,368 B2 | 10/2008 | Davidson et al. |
| 7,455,804 B2 | 11/2008 | Patel et al. |
| 7,455,805 B2 | 11/2008 | Oriakhi et al. |
| 7,497,977 B2 | 3/2009 | Nielsen et al. |
| 7,531,117 B2 | 5/2009 | Ederer et al. |
| 7,550,518 B2 | 6/2009 | Bredt et al. |
| 7,578,958 B2 | 8/2009 | Patel et al. |
| 7,597,835 B2 | 10/2009 | Marsac |
| 7,641,461 B2 | 1/2010 | Khoshnevis |
| 7,665,636 B2 | 2/2010 | Ederer et al. |
| 7,722,802 B2 | 5/2010 | Pfeiffer et al. |
| 7,807,077 B2 | 5/2010 | Ederer et al. |
| 7,736,578 B2 | 6/2010 | Ederer et al. |
| 7,748,971 B2 | 7/2010 | Hochsmann et al. |
| 7,767,130 B2 | 8/2010 | Elsner et al. |
| 7,795,349 B2 | 9/2010 | Bredt et al. |
| 7,799,253 B2 | 9/2010 | Höschmann et al. |
| 7,879,393 B2 | 2/2011 | Ederer et al. |
| 7,887,264 B2 | 2/2011 | Naunheimer et al. |
| 7,927,539 B2 | 4/2011 | Ederer |
| 8,020,604 B2 | 9/2011 | Hochsmann et al. |
| 8,096,262 B2 | 1/2012 | Ederer et al. |
| 8,186,415 B2 | 5/2012 | Marutani et al. |
| 8,349,233 B2 | 1/2013 | Ederer et al. |
| 8,506,870 B2 | 8/2013 | Hochsmann et al. |
| 8,524,142 B2 | 9/2013 | Unkelmann et al. |
| 8,574,485 B2 | 11/2013 | Kramer |
| 8,715,832 B2 | 5/2014 | Ederer et al. |
| 8,727,672 B2 | 5/2014 | Ederer et al. |
| 8,741,194 B1 | 6/2014 | Ederer et al. |
| 8,911,226 B2 | 12/2014 | Gunther et al. |
| 8,951,033 B2 | 2/2015 | Höchsmann et al. |
| 8,956,140 B2 | 2/2015 | Hartmann |
| 8,956,144 B2 | 2/2015 | Grasegger et al. |
| 8,992,205 B2 | 3/2015 | Ederer et al. |
| 9,174,391 B2 | 11/2015 | Hartmann et al. |
| 9,174,392 B2 | 11/2015 | Hartmann |
| 9,242,413 B2 | 1/2016 | Hartmann et al. |
| 9,321,934 B2 | 4/2016 | Mögele et al. |
| 9,327,450 B2 | 5/2016 | Hein et al. |
| 9,333,709 B2 | 5/2016 | Hartmann |
| 9,358,701 B2 | 6/2016 | Gnuchtel et al. |
| 2001/0045678 A1 | 11/2001 | Kubo et al. |
| 2001/0050031 A1 | 12/2001 | Bredt et al. |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2003/0004599 A1 | 1/2003 | Herbak |
| 2003/0065400 A1 | 4/2003 | Beam et al. |
| 2003/0069638 A1 | 4/2003 | Barlow et al. |
| 2003/0083771 A1 | 5/2003 | Schmidt |
| 2003/0113729 A1 | 6/2003 | DaQuino et al. |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Noel et al. |
| 2004/0045941 A1 | 3/2004 | Herzog et al. |
| 2004/0056378 A1 | 3/2004 | Bredt et al. |
| 2004/0084814 A1 | 5/2004 | Boyd et al. |
| 2004/0094058 A1 | 5/2004 | Kasperchik et al. |
| 2004/0104515 A1 | 6/2004 | Swanson et al. |
| 2004/0112523 A1 | 6/2004 | Crom |
| 2004/0138336 A1 | 7/2004 | Bredt et al. |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0239009 A1 | 12/2004 | Collins et al. |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0093194 A1 | 5/2005 | Christopher et al. |
| 2005/0167872 A1 | 8/2005 | Tsubaki et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0280185 A1 | 12/2005 | Russell et al. |
| 2006/0105102 A1 | 5/2006 | Hochsmann et al. |
| 2006/0108090 A1 | 5/2006 | Ederer et al. |
| 2006/0159896 A1 | 7/2006 | Pfeifer et al. |
| 2006/0175346 A1 | 8/2006 | Ederer et al. |
| 2006/0208388 A1 | 9/2006 | Bredt et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2007/0045891 A1 | 3/2007 | Martinoni |
| 2007/0057412 A1 | 3/2007 | Weiskopf et al. |
| 2007/0126157 A1 | 6/2007 | Bredt |
| 2007/0245950 A1 | 10/2007 | Teulet |
| 2008/0001331 A1 | 1/2008 | Ederer |
| 2008/0018018 A1 | 1/2008 | Nielsen et al. |
| 2008/0047628 A1 | 2/2008 | Davidson et al. |
| 2008/0138515 A1 | 6/2008 | Williams |
| 2008/0187711 A1 | 8/2008 | Alam et al. |
| 2008/0233302 A1 | 9/2008 | Elsner et al. |
| 2008/0237933 A1 | 10/2008 | Hochmann et al. |
| 2008/0241404 A1 | 10/2008 | Allaman et al. |
| 2008/0260945 A1 | 10/2008 | Ederer et al. |
| 2009/0011066 A1 | 1/2009 | Davidson et al. |
| 2009/0068376 A1 | 3/2009 | Philippi et al. |
| 2009/0261497 A1 | 10/2009 | Ederer et al. |
| 2010/0007062 A1 | 1/2010 | Larsson et al. |
| 2010/0212584 A1 | 8/2010 | Ederer et al. |
| 2010/0207288 A1 | 9/2010 | Enrico |
| 2010/0243123 A1 | 9/2010 | Voxeljet |
| 2010/0244301 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kashani-Shirazi |
| 2010/0323301 A1 | 12/2010 | Tang et al. |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2011/0308755 A1 | 12/2011 | Hochsmann |
| 2012/0046779 A1 | 2/2012 | Pax et al. |
| 2012/0094026 A1 | 4/2012 | Ederer et al. |
| 2012/0097258 A1 | 4/2012 | Hartmann et al. |
| 2012/0113439 A1 | 5/2012 | Ederer et al. |
| 2012/0126457 A1 | 5/2012 | Abe et al. |
| 2012/0291701 A1 | 11/2012 | Grasegger et al. |
| 2013/0000549 A1 | 1/2013 | Hartmann |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0092082 A1 | 4/2013 | Ederer et al. |
| 2013/0189434 A1 | 7/2013 | Randall et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2013/0313757 A1 | 11/2013 | Kashani-Shirazi |
| 2014/0048980 A1 | 2/2014 | Crump et al. |
| 2014/0202381 A1 | 7/2014 | Ederer et al. |
| 2014/0202382 A1 | 7/2014 | Ederer |
| 2014/0212677 A1 | 7/2014 | Gnuchtel et al. |
| 2014/0227123 A1 | 8/2014 | Gunster |
| 2014/0271961 A1 | 9/2014 | Khoshnevis |
| 2014/0306379 A1 | 10/2014 | Hartmann et al. |
| 2014/0322501 A1 | 10/2014 | Ederer et al. |
| 2015/0042018 A1 | 2/2015 | Gunther et al. |
| 2015/0069659 A1 | 3/2015 | Ederer et al. |
| 2015/0110910 A1 | 4/2015 | Hartmann et al. |
| 2015/0165574 A1 | 6/2015 | Ederer et al. |
| 2015/0210822 A1 | 7/2015 | Ederer et al. |
| 2015/0224718 A1 | 8/2015 | Ederer et al. |

(56) References Cited

U.S. PATENT DOCUMENTS

| | | |
|---|---|---|
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0375418 A1 | 12/2015 | Hartmann |
| 2015/0375419 A1 | 12/2015 | Gunther et al. |
| 2016/0001507 A1 | 1/2016 | Hartmann et al. |
| 2016/0052165 A1 | 2/2016 | Hartmann |
| 2016/0052166 A1 | 2/2016 | Hartmann |
| 2016/0107386 A1 | 4/2016 | Hartmann et al. |
| 2016/0114533 A1 | 4/2016 | Grassegger et al. |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |

FOREIGN PATENT DOCUMENTS

| | | |
|---|---|---|
| DE | 4305201 C1 | 4/1994 |
| DE | 4300478 | 8/1994 |
| DE | 4 325 573 | 2/1995 |
| DE | 29506204 U1 | 6/1995 |
| DE | 4440397 | 9/1995 |
| DE | 19525307 A1 | 1/1997 |
| DE | 19530295 C1 | 1/1997 |
| DE | 19528215 A1 | 2/1997 |
| DE | 29701279 U1 | 5/1997 |
| DE | 19545167 A1 | 6/1997 |
| DE | 69031808 T2 | 4/1998 |
| DE | 19853834 | 5/2000 |
| DE | 100 53 741 C1 | 2/2002 |
| DE | 69634921 T2 | 12/2005 |
| DE | 201 22 639 U1 | 11/2006 |
| DE | 10 2006 040 305 A1 | 3/2007 |
| DE | 102006029298 A1 | 12/2007 |
| DE | 102007040755 A1 | 3/2009 |
| DE | 10 2007 050953 A1 | 4/2009 |
| DE | 102007047326 A1 | 4/2009 |
| DE | 102011053205 A1 | 3/2013 |
| DE | 102015006363 A1 | 12/2016 |
| DE | 102015008 860 A1 | 1/2017 |
| DE | 102015011503 A1 | 3/2017 |
| DE | 102015011790 A1 | 3/2017 |
| EP | 0361847 B1 | 4/1990 |
| EP | 1415792 | 5/2004 |
| EP | 1381504 B1 | 8/2007 |
| FR | 2856614 A1 | 12/2004 |
| JP | S62275734 A | 11/1987 |
| JP | 2003136605 A | 5/2003 |
| JP | 2004082206 A | 3/2004 |
| JP | 2009202451 A | 9/2009 |
| WO | 01/40866 A2 | 6/2001 |
| WO | 2001/078969 A2 | 10/2001 |
| WO | 01/96048 A1 | 12/2001 |
| WO | 02/064353 A1 | 8/2002 |
| WO | 02/064354 A1 | 8/2002 |
| WO | 03/016030 A1 | 2/2003 |
| WO | 03/106067 A2 | 2/2003 |
| WO | 2004/010907 A1 | 2/2004 |
| WO | 2004-108398 A1 | 12/2004 |
| WO | 2005/082603 A1 | 9/2005 |
| WO | 2005/133219 A1 | 12/2005 |
| WO | 2007/039450 A1 | 4/2007 |
| WO | 2008/049384 A1 | 5/2008 |
| WO | 2008061520 A2 | 5/2008 |
| WO | 2011063786 A1 | 6/2011 |
| WO | 2011/095157 A1 | 8/2011 |
| WO | 2013075696 A1 | 5/2013 |
| WO | 2014090207 A1 | 6/2014 |
| WO | 2014166469 A1 | 10/2014 |
| WO | 2015078430 A1 | 6/2015 |
| WO | 2015081926 A1 | 6/2015 |
| WO | 2015085983 A2 | 6/2015 |
| WO | 2015090265 A1 | 6/2015 |
| WO | 2015090567 A1 | 6/2015 |
| WO | 2015096826 A1 | 7/2015 |
| WO | 2015149742 A1 | 10/2015 |
| WO | 2015180703 A1 | 12/2015 |
| WO | 2016019937 A1 | 2/2016 |
| WO | 2016019942 A1 | 2/2016 |
| WO | 2016058577 A1 | 4/2016 |
| WO | 2016095888 A1 | 6/2016 |
| WO | 2016101942 A1 | 6/2016 |
| WO | 2016146095 A1 | 9/2016 |

OTHER PUBLICATIONS

Cima et al., "Computer-derived Microstructures by 3D Printing: Bio-and Structural Materials," SFF Symposium, Austin, TX, 1994.

Sachs et al., "Three-Dimensional Printing: Rapid Tooling and Prototypes Directly from a CAD Model", Massachusetts Institute of Technology, pp. 131-136, Mar. 25-28, 1990.

Sachs et al., "Three-Dimensional Printing: Rapid Tooling and Prototypes Directly from a CAD Model", Massachusetts Institute of Technology, pp. 143 & 151, Jan. 1990.

Jacobs et al., 2005 SME Technical Paper, title "Are QuickCast Patterns Suitable for Limited Production?".

Feature Article—Rapid Tooling—Cast Resin and Sprayed Metal Tooling by Joel Segal, Apr. 2000.

Williams, "Feasibility Study of Investment Casting Pattern Design by Means of Three Dimensional Printing", Department of Mechanical Engineering, pp. 2-15, Jun. 1987.

Gephart, Rapid Prototyping, pp. 118-119, 1996.

Marcus et al., Solid Freeform Fabrication Proceedings, Nov. 1993.

Marcus, et al., Solid Freeform Fabrication Proceedings, Sep. 1995, p. 130-33.

Related Application, U.S. Appl. No. 12/681,957, filed Apr. 7, 2010, published as 2010/0212584.

International Search Report, Application No. PCT/DE2011/000092, dated Jul. 7, 2011, Published as WO2011/095157.

International Preliminary Report on Patentability, Application No. PCT/DE2011/000092, dated Aug. 7, 2012.

European Office Acton dated Jul. 17, 2013; Application No. 11718245.1.

Voxeljet's VXconcept—Continuous 3D printing for sand casting, You-Tube, Nov. 16, 2011, XP002713379, retrieved from the Internet URL: http://www.youtube.com/watch?v=hgIrNXZjIxU retrieved on Sep. 23, 2013.

Armin Scharf, "Erster 3D-Endlosdrucker", zwomp.de, http://www.zwomp.de/2012/11/06/voxeljet-endlosdrucker/ dated Nov. 6, 2012.

EOS Operating Manual for Laser Sintering Machine with Brief Summary, Feb. 22, 2005.

DEVICE FOR PRODUCING THREE-DIMENSIONAL MODELS

The invention relates to a device for manufacturing three-dimensional models as expressed in the generic concept of patent claim 1.

A method for producing three-dimensional objects from computer data is described in the European patent specification EP 0 431 924 51. In this method, a particulate material is deposited in a thin layer onto a platform which, if needed, is surrounded by a chamber and then a binder material is selectively printed on the particulate material using a print head. The particle area onto which the binder is printed sticks together and solidifies under the influence of the binder and, if necessary, an additional hardener. The platform is then lowered by a distance of one layer thickness into a build cylinder and provided with a new layer of particulate material, which is also printed as described above. These steps are repeated until a certain, desired height of the object is achieved. A three-dimensional object is thereby produced from the printed and solidified areas.

The object produced from the solidified particulate material is embedded in loose particulate material as described above and such is subsequently removed therefrom. This is done, for example, using an extractor. This leaves the desired objects, from which the remaining powder is removed, e.g. by brushing.

Other powder-supported rapid prototyping processes work in a similar manner, for example, selective laser sintering or electron beam sintering, in which a loose particulate material is also deposited in layers and selectively solidified with the aid of a controlled physical radiation source.

All these methods are referred to collectively below as "three-dimensional printing methods" or "3D printing methods".

A special feature during layer-building of the three-dimensional printing process consists of the vertical movement (Z direction) of the build platform. This proceeds in very small increments, namely according to the height of the particle layer, typically in the size range between 20 µm and 500 µm.

Maintenance of the exact increment during lowering of the build platform is critical for many building solidification mechanisms, however, the binding of the particle material must be assured not only in the horizontal plane, but also in the vertical direction. If the build platform lowers in a larger increment due to defective movement of the Z-axis, this may result in the current layer not being able to properly bond with the underlying layer. This results in the so-called delamination which, in turn, results in an unusable component.

The Z-movement of the build platform also affects the accuracy of the component. The total deviation of the actual movement from the target movement by means of the build platform proceeds linearly in relation to the component tolerance and is undesirable for this reason.

In addition, every other deviation of the actual from the target movement by means of the build platform is visibly manifest as defects in the component. These deviations include, for example, wobbling movements of the build platform as well as slipping in the horizontal plane.

Acting as loads on the build platform are the forces of its own weight as well as the weight increasing during the layer-building process due to the powder feedstock and binder, respectively, the model.

In addition, acting in opposition to every movement of the build platform in the build cylinder are frictional forces between the seal and the build platform and build cylinder wall. Such a seal is necessary so that the powder cannot run through the gap between the build platform and chamber wall and thereby lead to malfunctions that could result in blockages. These frictional forces of the seals contacting the chamber wall can be very large if an error occurs, such as during a blockage of the seal.

Not least of all are also the forces and torque moments generated by the drive itself, which directly affect the build platform.

Current solutions regarding guidance and movement of the build platform include a so-called Z axis that consists of one guiding element and one drive unit. The guiding element ensures minimal deviation of the actual movement from the target movement of the build platform in respects to all three solid angles and the two horizontal directional components. The drive unit defines the exact vertical position of the platform.

A build chamber is known from the prior art, for example from WO 01/96048 A1, that possesses a movable piston connected with a spindle by means of a coupling device that, in turn, can be driven by a motor.

A similar mechanism is also known, for example, from WO 2007/039450 and U.S. Pat. No. 5,387,380.

Normally, one or more linear guiding elements with ball-bearing equipped carriages are used. Ball-screw spindle drives with servo or stepping motors have been traditionally used for this purpose. This is known from the prior art, for example from EP 1 322 438 B1, whereby therein are described yet other drive mechanisms for vertical adjustment.

The rigidity of a guiding element to counter wobbling movements of the build platform relating to the X or V axes is determined by the length of one guide carriage or by the distance of multiple guide carriages on the guide rail. This distance must be appropriately taken into consideration in dealing with the overall length of the guiding element.

In the case of 3D printing systems, such a guiding element must not penetrate past the so-called build plane because other axes acting to move the print head are running here. The result of this is that the axis for guidance must either be placed external to the build plane or located entirely beneath this. In the first case, the torque moments that act upon the axis are increased by the additional leverage.

The torque rigidity of common guidance systems, such as recirculating ball-bearings on guide rails, is realised by means of the distance of the force deflection points in the guide rails, e.g. by the guide carriages. The result of this is that greater torque rigidity equates to a greater distance of the guide carriages. In the case of usage of a change system for job boxes, containing a build platform and an edge, the guiding element must be at least as long as the lift height of the build platform in the box plus the distance of the guide carriages.

If the guiding element is located below the build plane and if torque rigidity is greater, then the position of the build plane is displaced upward in the vertical direction. If the build plane can no longer be viewed due to the overall height of the arrangement, then this enormously restricts user-friendliness.

In another known embodiment, the guidance function is assumed by the chamber wall. In order to withstand any possible torque moments relating to the X and Y axes, multiple spindle drives that are distributed across the build platform are utilised. The disadvantage in this is that the guidance accuracy of the chamber wall is determined by the manufacturing accuracy. However, the manufacture of such chamber walls that corresponds to these requirements is time-, resource- and cost-intensive. To do so, the entire chamber wall must be mechanically machined in order to fulfil the required tolerances. Furthermore, the wall must also be sufficiently rigid to maintain such tolerances even during loads, for example, due to seal frictional forces.

According to the present invention, an object of the device relates to enabling the build platform to move in the Z axis direction with yet even greater exactitude.

This object is achieved by a device according to patent claim 1.

According to the present invention, a device for manufacturing three-dimensional models using a 3D printing process is described, whereby the build material is deposited in layers on a build platform. In order to execute the process, namely lowering of the build platform by respectively one particle layer, the build platform should be moveable in the Z-direction, and one or multiple drive units and one or multiple guiding elements are provided for said movement.

It should be reiterated that the Z direction in this context means the vertical direction relating to the build platform surface on which the component is built.

In so doing, drive units and guiding elements are arranged in such a way that a movement of the drive units is decoupled from the movement of the guiding element(s). According to the present invention, decoupled means that the undesirable movements and forces, which are incurred due to drive elements, are not transmitted to the guiding elements.

Said device now makes it possible for a 3D print method using layer building technology to execute the required lowering of the build platform in the Z direction and thereby fulfil the drive and guidance objects as per the given loads and with a high level of accuracy, even in the case of usage of build platforms of larger dimensions.

According to one preferred embodiment of the invention, at least two drive units are provided. Such a design can be advantageous in that drive motion can take place with the least amount of undesirable displacements.

Furthermore, it can be advantageous that a device according to the invention has drive units that include at least one spindle drive. Spindle drives have proven to be particularly advantageous due to their exhibiting relatively exact drive motion.

According to a further preferred embodiment of the invention, the drive elements are arranged beneath the build platform so that the vertical force can be deployed very well thereby reducing torque moments relating to the horizontal axes.

In one variant of the invention, the deployment of multiple spindles largely absorbs the torsional moments of the spindle nuts of the connected torsionally-stiff spindles via the build platform.

In order to optimally absorb the vertical forces, another preferred embodiment of the invention uses four spindles arranged at the corners of the build platform. Bessel points on the build platform diagonals are considered as optimal connection points in regards to flexing of the build platform. If an optimally stiff system is prerequisite, a combination of one individual spindle with one individual guiding element is also functionally sufficient.

It is also possible to absorb and thereby divert torsional moments by the torsionally stiff connection of multiple, but at least two, spindles via the drive plate.

In order to guarantee adequate positioning accuracy and repeatability in the vertical direction, preloaded spindle nuts are generally used. This hereby reduces axial as well as radial play. Such spindle drives tend to wobble during movement due to manufacturing and assembly tolerances. This means that the mounting point of the spindle moves relatively perpendicular to the spindle nut and transversely to the spindle axis. For example, the wobble pitch increases with the distance of the spindle nut to the spindle connection. In the case of inadequate guidance, the wobble pitch can lead to undesirable lateral movement of the build platform during the build process. Components generated by the machine and thereby affected by such defective movements manifest periodic stepping in the vertical direction.

A sufficiently stiff guidance system prevents displacement of the build platform. If wobble motion occurs, the spindle drive will elastically deform. This correspondingly leads to high forces and resulting torque moments on the guiding elements. The guiding element must be dimensioned very long in this case. However, this measure increases the construction height of the overall device, which is undesirable.

It is therefore necessary to reduce torque moments at the guiding elements. According to the invention, this occurs by decoupling the movement of the spindle drive from the movement of the build platform in the horizontal direction.

According to one preferred embodiment of the invention, the drive elements engage with the build platform via a so-called compensation platform.

If the machine is designed as a system with changeable chambers, it may make sense to switchably engage the build platform of the changeable chamber (job box floor) to a machine axis via an additional lifting platform.

For example, it is conceivable that the drive spindles are not directly supporting the build platform, but rather the compensation platform. This can move freely in the horizontal plane in contrast to the build platform. A switchable connection to the build platform is located on the lift platform above the compensation platform. The lift platform and compensation platform are connected with axial bearings in such a way that no play occurs in the vertical direction and no forces can be transmitted in the horizontal plane. The lift platform is connected with a frame via a guiding element that limits or completely eliminates horizontal displacements. The spindle nuts are mounted in a radially pivotable fashion on a base plate to which, in turn, the frame is attached. The spindle nuts are either driven individually or e.g. by means of a common belt.

In this arrangement, wobble movements of the individual spindles result in a joint movement of the compensation platform. This motion can neither be further transmitted to the lift platform nor to the build platform.

In a further embodiment, the spindles are attached in a torque-stiff but radially movable fashion to the lift platform. This type of bearing connection can be implemented by e.g. use of flexure hinges or plain friction bearings. The advantage of the previously described variants is the prevention of preloading stresses in the arrangement.

Due to the decoupling of guiding elements and drive units, the torsional moment of the spindles can no longer be transmitted to the guiding elements. In this regard it is advantageous if at least two spindles are deployed whose drive torque moments are mutually countered and supported.

For the purpose of more detailed explanation, the invention is described in further detail below on the basis of preferred embodiments with reference to the drawing.

Figure 1:
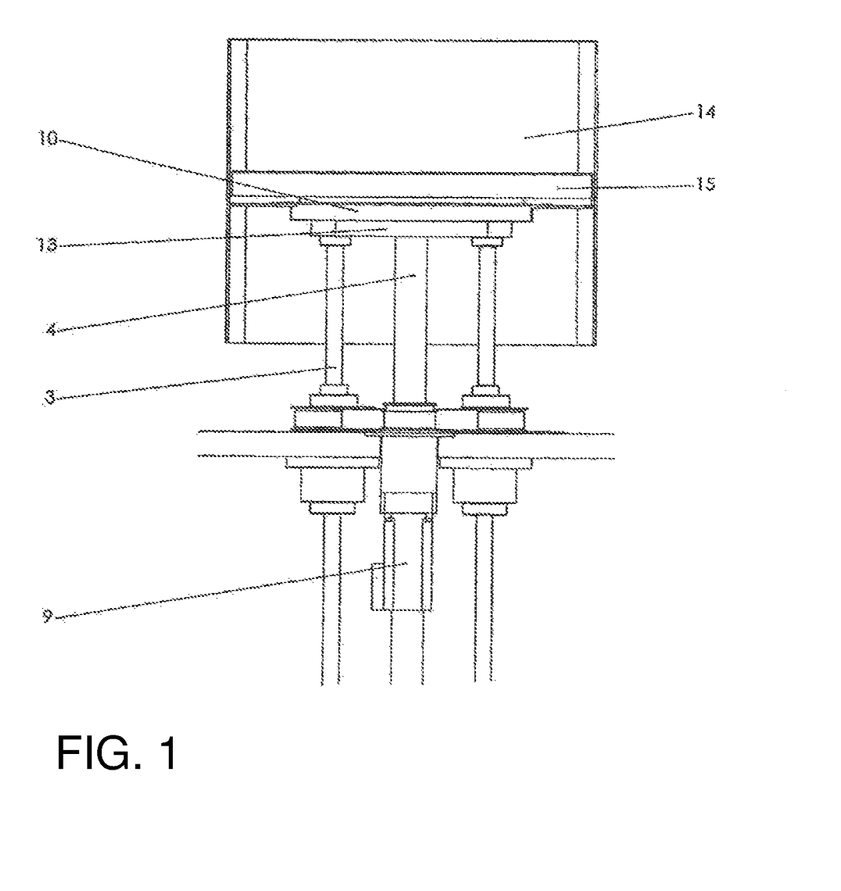
FIG. 1 A frontal view of the device according to one preferred embodiment of the invention.
Figure 2:
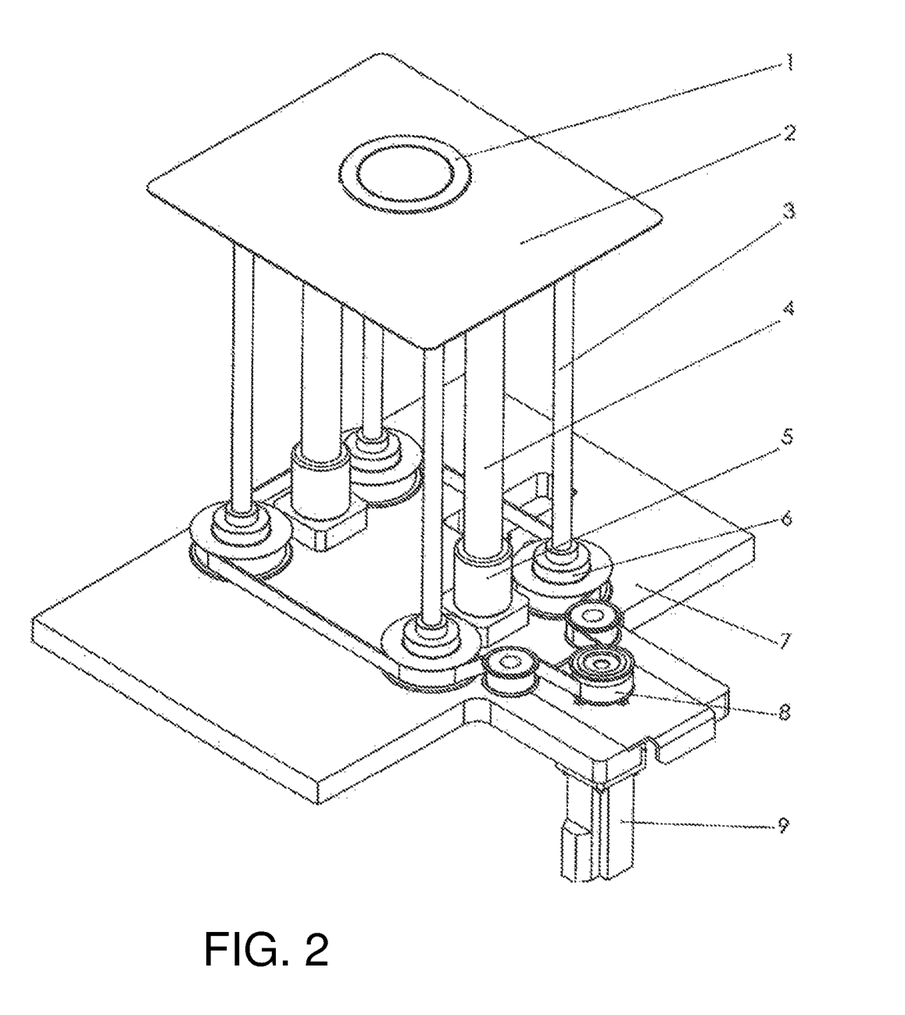
FIG. 2 A spatial representation of the device according to one preferred embodiment of the invention.

FIG. 1 and FIG. 2 relate to the description of a preferred embodiment of the invention. In the displayed representation of the embodiment of the invention, the layer-wise building process of models takes place on the vertically positionable build platform (15).

Build platform (15) moves within a framework encompassing it on all sides. Together with the build platform (15), this framework comprises the changeable chamber (14) or job box.

The job box (14) is introduced in the 3D print machine via e.g. roller guides and secured in a defined position and locked against displacements in all directions. To construct three-dimensional models, the build platform (15) is moved in the Z axis direction (vertical machine axis). In so doing, the build platform (15) according to the displayed preferred embodiment of the invention statically engages with a lift platform (2) via a switchable clamping system (1) by means of which the clamping system (1) and the thereby connected job box floor, respectively, the build platform (15), can be moved vertically.

In the displayed embodiment, four drive spindles (3) are provided, which are connected with the lift platform (2) and vertically position this platform.

Moreover according to the displayed example, there is at least one guiding element (4) provided, which is connected to the lift platform (2) and accurately guides this lift platform (2) vertically, and respectively, absorbs horizontal forces.

In addition, the machine framework (7) bears the guide bearing (5) and a spindle drive system.

A spindle guide system according to the displayed preferred embodiment of the invention consists of four pivotable, bearing-equipped spindle nuts (6). In turn, all spindle nuts (6) are connected with a drive motor (9) via a drive belt (8).

In order to move the build platform (15), respectively move the lift platform (2) in the Z direction, the motor (9) drives all the spindles (3) at the same speed via the belt (8). In this manner, the smooth and evenly paced extension of the Z axis of the device is assured.

Figure 3:
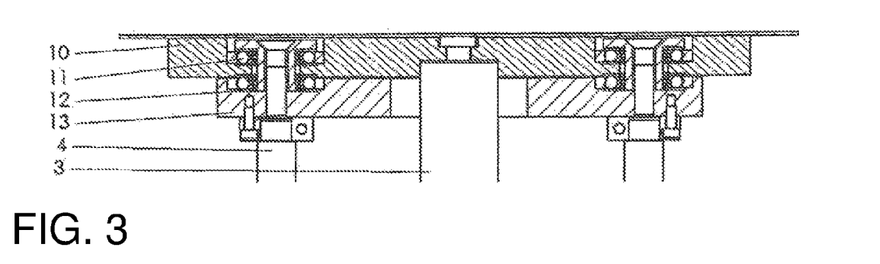
FIG. 3 A cross-section view of the device according to another preferred embodiment of the invention.
Figure 4:
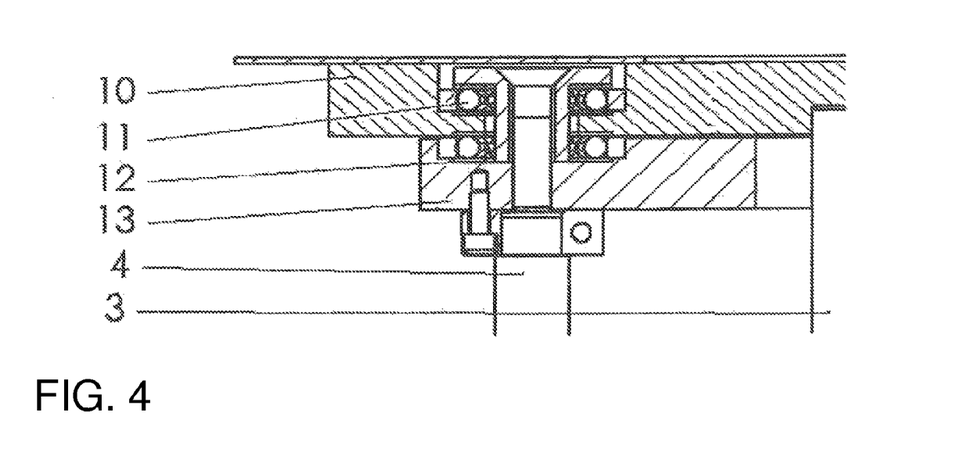
FIG. 4 An enlarged view of the cross-section of FIG. 3.

It can be seen in FIGS. 3 and 4 that according to the displayed preferred embodiment of the invention the lift platform (2) is subdivided into two plates, namely in a guidance plate (10) and a drive plate (13). The guidance plate (10) bears the clamping system (1) and is solidly connected with the guiding elements, which are herein displayed as guide rods (4).

The drive plate (13) bears the four drive spindles (3) in a torsionally inflexible manner. Furthermore, the drive plate (13) and the guidance plate (10) are connected to one another via a rolling-contact bearing. The rolling-contact bearing is hereby e.g. a combination of bearing disks (12) of axial needle roller bearings and a ball-bearing retainer (11) of axial groove ball bearings. This combination enables freedom of movement in the X and Y direction. In this manner, the system is positioned without any play in the Z direction.

On the underside of the platform is the drive plate (13), Through large holes, the guide rods (3) move without contact through the drive plate (13). The guide rods (3) are thereby connected with the drive plate (10).

Any distorting displacements occurring during operation are transmitted from drive spindles (3) to the drive plate (13). The movements are decoupled by bearing (11) and (12). The exact guidance of the build platform is achieved by the guidance plate (10), which horizontally connects to the housing via guide rods (3).

Figure 5:
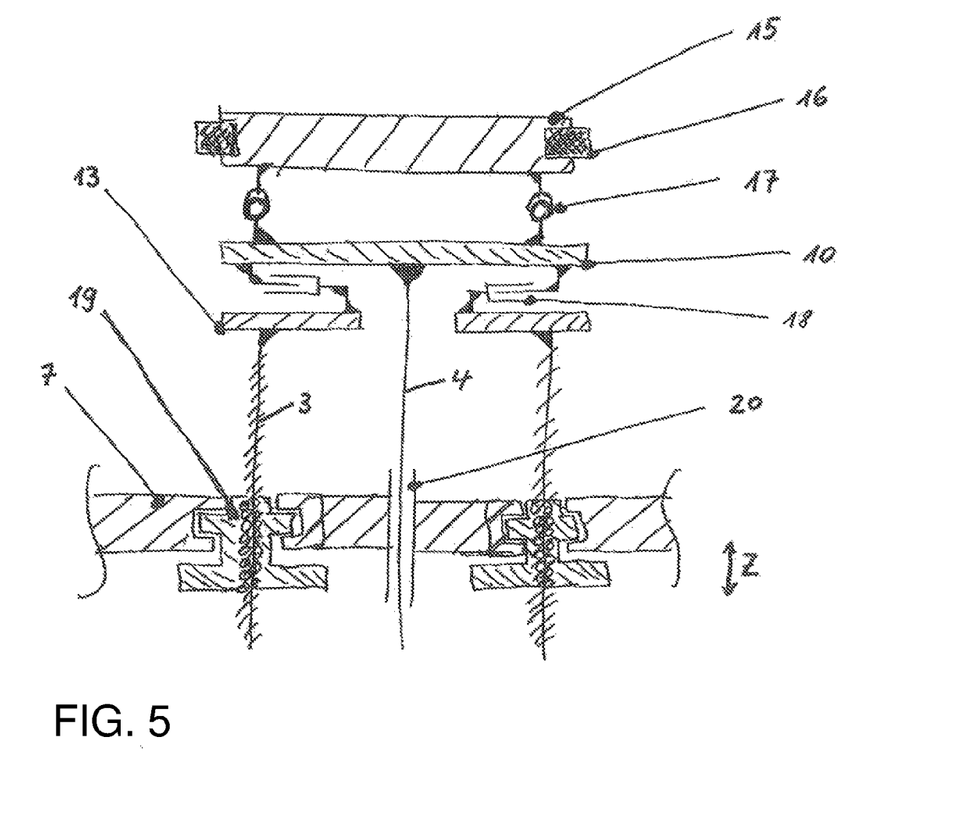
FIG. 5 A cross-section view of the device according to yet another preferred embodiment of the invention.

In FIG. 5, another design variant of the device according to the invention is shown.

A build platform (15) is arranged with slidably-mounted seals (16) running along the Z direction edge (not shown here).

According to the displayed preferred embodiment, the build platform (15) is connected to the guidance plate (10) via switchable connections (17). The guiding element (4) engages the guidance plate (10), which in turn guides the linear guiding elements (20) through the machine frame (7). Further, the guidance plate (10) is connected via compensation bearings (18) to the drive plate (13), which, in turn, engages with the drive spindles (3), which are driven by a spindle drive (19) enabling movement of the build platform (15).

DESIGNATION LIST

1 Clamping system
2 Lift platform
3 Drive spindles
4 Guiding element
5 Guide bearing
6 Spindle nut
7 Machine frame
8 Belt
9 Motor
10 Guidance plate
11 Ball-bearing retainer
12 Bearing
13 Drive plate
14 Job box/changeable chamber
15 Building platform
16 Seals
17 Switchable connection
18 Compensation bearings
19 Spindle drive
20 Linear guiding elements

What is claimed is:

1. A method for 3D printing comprising the steps of: i) depositing a build layer including one or more build materials on a build platform, wherein the build materials includes a particulate material and the build layer has a height; ii) lowering the build platform; and iii) repeating steps i) and ii) to print a 3D object; wherein the step of lowering the build platform includes a step of vertically driving one or more Z-axis drive units connected to a horizontal drive component for moving the horizontal drive component in a vertical direction; wherein a horizontal guide component is supported by the horizontal drive component, positioned above the horizontal drive component, and is vertically displaced by the moving of the horizontal drive component; wherein the guide component is free to move horizontally relative to horizontal drive component; and wherein the build platform is the horizontal guide component or the build platform is supported by the horizontal guide component and connected to the horizontal guide component.

2. The method of claim 1, wherein the vertical increment is generally equal to the height of the build layer.

3. The method of claim 2, wherein the horizontal guide component is a guide plate, and the horizontal drive component is a drive plate.

4. The method of claim 3, wherein the guide plate is connected to one or more guide elements that are capable of moving only in a generally vertical direction so that the guide plate does not move rotationally or axially in the horizontal plane.

5. The method of claim 4, wherein the drive plate has one or more openings for the one or more guide elements, wherein the openings are sufficiently large to allow for horizontal movement of the drive plate without contacting the guide elements.

6. The method of claim 5, wherein the one or more guide elements inhibits rotation of the build platform.

7. The method of claim 6, wherein the one or more guide elements inhibit horizontal translational motion of the build platform.

8. The method of claim 7, wherein the vertical increment is 20 µm to 500 µm.

9. The method of claim 7, wherein the drive plate is moved by a plurality of the z-axis drive units.

10. The method of claim 9, wherein the z-axis drive units are driven by a common motor.

11. The method of claim 9, wherein each z-axis drive unit includes a drive spindle and a spindle nut.

12. The method of claim 7, wherein the guide plate and the drive plate are connected by axial bearings so that substantially no play between the guide plate and the drive plate occurs in the vertical direction and substantially no horizontal forces can be transmitted between the guide plate and the drive plate.

13. The method of claim 7, wherein the build platform is supported by the guide plate and connected to the guide plate.

14. The method of claim 13, wherein the guide platform and the build platform are connected via a switchable clamping system.

15. The method of claim 13, wherein during the build of the object, the guide plate and the build platform do not move relative to each other.

16. The method of claim 7, wherein the z-axis drive units are mounted on a common frame.

17. The method of claim 1, wherein the method includes moving the horizontal drive component relative to the horizontal guide component in a horizontal direction during the step of lowering the build platform.

18. The method of claim 1, wherein the method includes moving the horizontal drive component relative to the horizontal guide component in a translational horizontal direction during the step of lowering the build platform.

19. The method of claim 1, wherein the method includes rotating the horizontal drive component relative to the horizontal guide component in a horizontal direction during the step of lowering the build platform.

20. The method of claim 1, wherein the horizontal guide component is a guide plate, and the horizontal drive component is a drive plate, the drive plate has one or more openings for the one or more guide elements, wherein the openings are sufficiently large to allow for horizontal movement of the drive plate without contacting the guide elements.

* * * * *

UNITED STATES PATENT AND TRADEMARK OFFICE
CERTIFICATE OF CORRECTION

PATENT NO. : 9,925,721 B2
APPLICATION NO. : 14/547676
DATED : March 27, 2018
INVENTOR(S) : Josef Grasegger et al.

Page 1 of 1

It is certified that error appears in the above-identified patent and that said Letters Patent is hereby corrected as shown below:

In the Claims

Column 6, Line 65, delete "component; wherein the guide" and insert --component; wherein the horizontal guide--

Signed and Sealed this
Eighth Day of May, 2018

Andrei Iancu
*Director of the United States Patent and Trademark Office*